United States Patent
Dourish et al.

(10) Patent No.: US 6,430,575 B1
(45) Date of Patent: Aug. 6, 2002

(54) COLLABORATIVE DOCUMENT MANAGEMENT SYSTEM WITH CUSTOMIZABLE FILING STRUCTURES THAT ARE MUTUALLY INTELLIGIBLE

(75) Inventors: J. Paul Dourish, San Francisco; John O. Lamping, Los Altos, both of CA (US); Thomas Rodden, Lancaster (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/393,599

(22) Filed: Sep. 10, 1999

(51) Int. Cl.[7] ............................................. G06F 12/00
(52) U.S. Cl. .......................... 707/200; 707/3; 707/10; 345/733; 345/751
(58) Field of Search ................................ 707/102, 514, 707/515, 10, 1, 100, 104.1, 3, 200; 345/733, 751

(56) References Cited

U.S. PATENT DOCUMENTS 5,355,497 A * 10/1994 Cohen-Levy ............... 707/200
5,423,034 A * 6/1995 Cohen-Levy et al. ......... 707/10
6,237,011 B1 * 5/2001 Ferguson et al. ............ 707/515

OTHER PUBLICATIONS

Akscyn, Robert M. et al. "KMS: A Distributed Hypermedia System for Managing Knowledge in Organizations," Communications of the ACM, vol. 31, No. 7, Jul. 1988, pp. 820–835.

Dourish et al. in "Building Bridges: Customisation and Mutual Intelligibility in Shared Category Management," published on the Internet at http://www.parc.xerox.com/csl/members/dourish/papers/index.html/.

Dourish et al. "Using Properties for Uniform Interaction in the Presto Document System," published on the Internet at http://www.parc.xerox.com/csl/members/dourish/papers/index.html/.

Ishii, Hiroshi et al. "Integration of Inter–Personal Space and Shared Workspace: ClearBoard Design and Experiments," CSCW 92 Proceedings, Nov. 1992, pp. 33–42.

King, David et al. "Intelligent Executive Information Systems," IEEE Expert/Intelligent Systems & Their Applications, vol. 11, No. 6, Dec. 1996, pp. 30–35.

Lu, Iva M. et al. "Idea Management in a Shared Drawing Tool," Proceedings of the Second European Conference on Computer–Supported Cooperative Work, Amsterdam, The Netherlands, Sep. 25–27, 1991, pp. 97–112.

MacLean, Allan et al. "User–Tailorable Systems: Pressing the Issues with Buttons," Proceedings of CHI'90: Human Factors in Computing Systems, Seattle, Washington, Apr. 1–5, 1990, pp. 175–182.

Rosenblum, Mendel et al. "The Design and Implementation of a Log–Structure File System," ACM Transactions on Computer Systems, vol. 10, No. 1, Feb. 1992, pp. 26–52.

Simone, Carla et al. "Interoperability as a Means of Articulation Work," WACC '99, San Francisco, California, Feb. 1999, pp. 39–48.

* cited by examiner

Primary Examiner—Kim Vu
Assistant Examiner—Hung Pham

(57) ABSTRACT

A collaborative document management system is adapted to provide customizable filing structures that are mutual intelligible. Initially, a common filing structure is defined. Subsequently, changes are made to the common filing structure to define any number of customized filing structures. The changes are recorded by the document management system as sequences of modifications. Using recorded sequences of modifications, documents are retrieved using a filing structure that is different from the filing structure in which the document was filed.

20 Claims, 6 Drawing Sheets

COLLABORATIVE DOCUMENT MANAGEMENT SYSTEM WITH CUSTOMIZABLE FILING STRUCTURES THAT ARE MUTUALLY INTELLIGIBLE

BACKGROUND OF THE INVENTION

1. Field of the Invention

The present invention relates generally to a collaborative document management system for classifying shared collections of documents, and more particularly, to a method and apparatus for providing customizable categorizations of the shared collection of documents that are mutually intelligible.

2. Description of Related Art

Much of the project-based work that exists today requires extensive collaboration by different groups of individuals. Such collaboration involves activities that include the continual adaptation, appropriation and reconfiguration of technologies, artifacts, and environment. In many instances, a set of documents is used to tie a collaborative activity (e.g., a construction project) together across different groups of individuals that form one or more organizations. For example, different groups of individuals may work together to develop a set of documents that are sometimes called project files. These project files when stored electronically may be categorized in a project directory so that they can be shared across the groups of individuals. A single categorization of the files in project directory may not satisfy the work practice of each group (or individual) because different groups may have different focuses. In addition, the categorization of a project directory tends to evolve over time because different groups may contribute to the collection of documents at different points in time.

In addition, directory structures are also used to categorize a large heterogeneous corpus of shared documents stored in an electronic database. Large corpuses of documents are often difficult to search because of the sheer size of the corpus. A directory structure of a corpus of documents is a shared resource that is used to communicate information about the documents. That is, directory structures provide a categorization schema for searching for a document in a corpus. Consequently, the directory structure often becomes a crucial if not the single means for locating documents in the corpus. In addition, the manner in which documents are categorized in a directory structure is often used to communicate information about the content of the documents. Thus, the inability to properly define a directory structure becomes tantamount to the loss of data or information about shared collection of documents.

It is desirable to allow the customization of the directory structure of a shared collection of documents so that the directory structure can more effectively represent the aspects of a group's or an individual's particular role in a project. By customizing a project directory structure, a particular group or individual is better able to categorize documents to better suit their immediate needs and evolving work practices. Advantageously, customization tends to increase the efficiency of a group's or an individual's use of the files in a project directory. One drawback of customization, however, is that it may have the effect of rearranging the structure of the project directory in such a way that a customized directory structure becomes either structurally or semantically incompatible with the project directory structure or other customized directory structures. Directory structures become "structurally incompatible" when a user introduces a change that eliminates any one-to-one relationship between directory structures. In contrast, directory structures become "semantically incompatible" when a user introduces a change that affects the semantic mapping between directory structures without affecting the structural mapping.

Current collaborative document management systems, which share document content, pre-suppose a single, fixed filing structure for categorizing information. A relational database is an example of a collaborative document management system that provides different views of a shared repository of information. Each view in a relational database, however, is not a customized view of information but is instead a subset of a large predefined set of fixed categories. It is therefore desirable to provide a document management system in which different individuals (or groups) can share customizations to a core directory structure (e.g., project directory structure). That is, it would be desirable to provide a system that can "translate" between different levels of customization by interpreting documents according to both the directory structure under which they are filed and the directory structure under which they are retrieved.

SUMMARY OF THE INVENTION

In accordance with the invention, there is provided a method and apparatus therefor, for sharing customizations to a filing system in which documents stored in memory (e.g., a shared repository) are categorized and accessed by multiple users through an application program interface. To begin, the application program interface receives input for defining a core filing structure having hierarchically organized filing categories. The core filing structure provides a first mapping for categorizing documents stored in the memory. In addition, the application program interface receives input for defining a first customized filing structure having hierarchically organized filing categories. The first customized filing structure is defined by a first sequence of modifications to the core filing structure to provide a second mapping for categorizing documents stored in the memory. Also, the application program interface receives input for categorizing documents stored in the memory according to one of the core filing structure and the first customized filing structure. In operation, the application program interface receives input requesting that a first document stored in the memory and categorized according to one of the core filing structure and the first customized filing structure be viewed according the other of the core filing structure and the first customized filing structure. The apparatus translates between the core filing structure and the first customized filing structure with the first sequence of modifications. The translation categorizes the first document stored in the memory even though the first mapping defined by the core filing structure is incommensurate with the second mapping defined by the first customized filing structure.

In accordance with another aspect of the invention, there is provided a method and apparatus therefor, for receiving at the application program interface input for defining a second customized filing structure having hierarchically organized filing categories. The second customized filing structure is defined by a second sequence of modifications to the core filing structure to provide a third mapping for categorizing documents stored in the memory. The application program interface receives input for categorizing documents stored in the memory according to one of the first customized filing structure and the second customized filing structure. Also, the application program interface receives input requesting that a second document stored in the memory and categorized according to one of the first customized filing structure and the second customized filing structure be organized according the other of the first customized filing structure and the second customized filing structure. The apparatus translates between the first customized filing structure and the second customized filing structure with the first sequence of modifications and the second sequence of modifications. The translation categorizes the second document stored in the memory even though the second mapping defined by the first customized filing structure is incommensurate with the third mapping defined by the second customized filing structure.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Collaborative Document Management System

Figure 1:
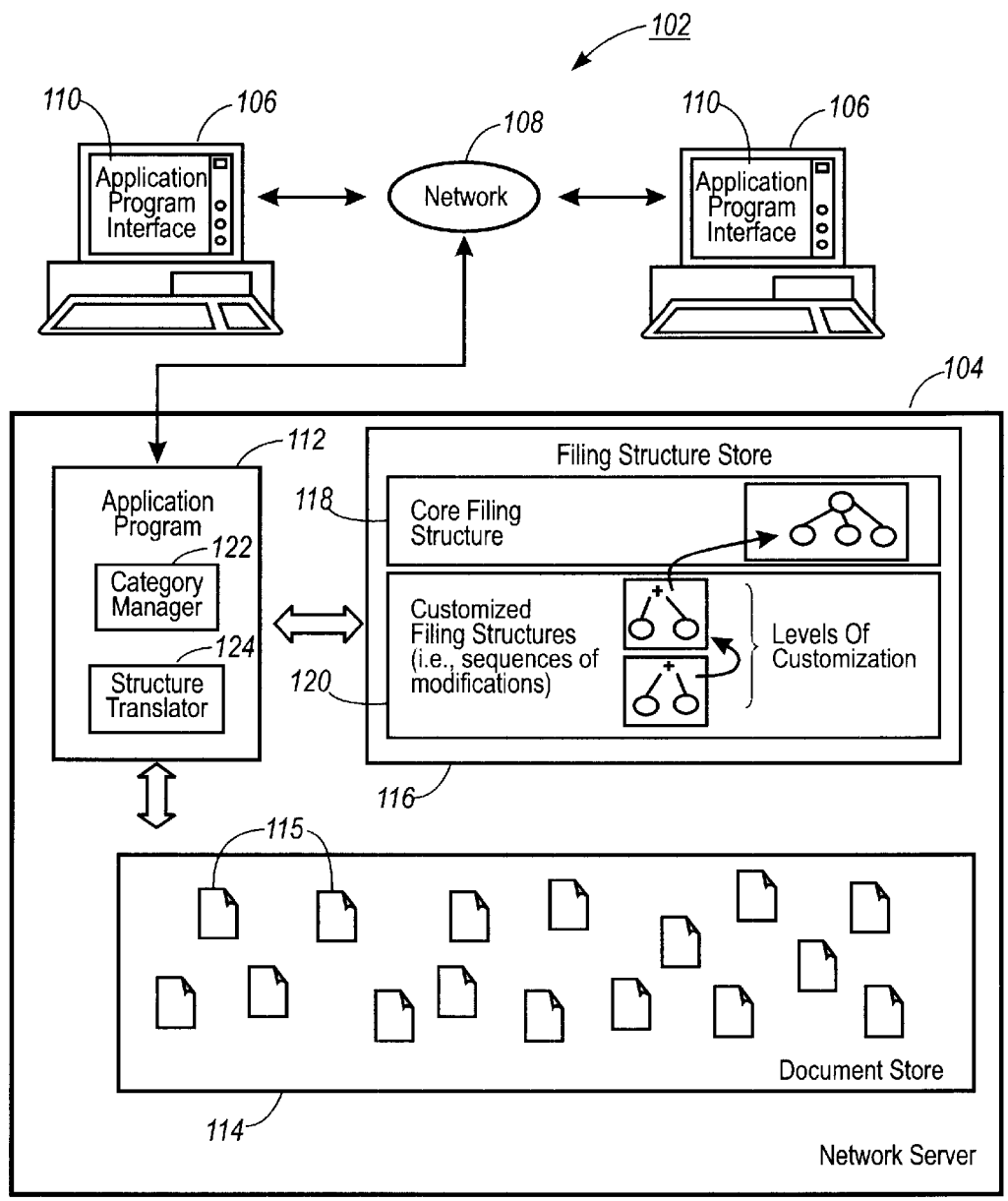
FIG. 1 illustrates an operating environment for performing the present invention.

FIG. 1 illustrates an operating environment 102 for performing the present invention. The operating environment 102 is used to define a collaborative document management system that includes a network sever 104 that is accessed by client computers 106 over network 108. A program interface 110 operates on client computers 106 for accessing an application program 112 operating on the network server 104. The application program 112 accesses in memory of the network server 104 a document store 114 and a filing (i.e., category) structure store 116 to provide customizable filing structures to the users of the computers 106. The document store 114 is a shared repository of documents that stores documents (i.e., data) independent from the filing structure store 116 that records different categories in which documents 155 in the document store are organized. A document is defined herein as any object that contains or identifies (e.g., URL) information.

It will be appreciated by those skilled in the art that the elements forming the operation environment 102 can be arranged in different configurations. For example, in one alternate embodiment, a separate instance of the application program 112 operates with the application program interface 110 on each client computer 106. In one embodiment, the application program interface is accessed through a web browser. In another configuration, the network server 104 is substituted for an application server for operating the application program 112 and a backend database server(s) by storing the contents of the document store 114. In this alternate embodiment, the filing structure store 116 can be resident in memory on either the application server or the backend database server. Regardless of the configuration of the elements defined in the network server 104 shown in FIG. 1, a logical separation between the document store 114 and the category store 116 is desirable to effectively maintain customized filing structures.

In accordance with one aspect of the invention, the filing structure store 116 has defined therein a core filing structure 118 and one or more levels of customized filing structures 120. Each customized filing structure 120 is defined using a sequence of modifications. Each sequence of modifications defines customizations to the core filing structure 118 or a preexisting customized filing structure 120. In operation, a user at the application program interface 110 defines the core filing structure 118 to provide a generic framework (i.e., category schema) for categorizing the documents 115 in the document store 114. In one embodiment, this category schema is a directory structure that is used to classify the documents 115 in document store 114 so that they can be readily located by a plurality of users. In effect, the category schema is a shared resource that defines the use of the documents categorized thereby.

Once defined, the core filing structure 118 can be viewed and/or edited at the application program interface 110 through category manager 122 to define customized filing structures 120. Once a filing structure is defined in the filing structure store 116, documents 115 stored in the document store 114 can be categorized therein. The act of categorizing documents in the filing structure store does not involve moving documents between physical directories. Instead, categorizing documents involves the assignment of unique values to one or more predefined document properties (e.g., document filing location). These document properties can be used to individually categorize the collection of documents.

After documents are categorized using the category manager 122, the documents can be viewed (i.e., retrieved) according to the context of a particular filing structure that is distinct from the context under which they were filed. That is, once a document is filed according to a particular filing structure, the context in which that document was filed can be mapped to other customized filing structures in a manner that is transparent to users operating the application program interfaces. In accordance with another aspect of the invention, a structure translator 124 translates between different levels of customization that provide different perspectives into the shared repository of documents 114. More specifically, the structure translator 124 computes a mapping between different levels of customization to provide different interpretations of the shared repository of documents.

Once a document directory is identified, documents can be ordered in the directory according to a predefined set of properties (e.g., name, creation date, file size, etc.). FIGS. 2–7 illustrate the categorization of documents in accordance with the invention in a conventional filing system. Documents in conventional filing systems are generally categorized in a directory structure using single property (e.g., where in the directory the document is located). The directory may be organized in a hierarchical structure that identifies greater levels of detail at lower levels in the hierarchy. It will be appreciated by those skilled in the art, however, that, as described in an alternate embodiment below, the present invention can be used to categorized metadata defining a plurality of document properties. Metadata is defined herein as any data in or referenced by a document that refers to information about a document that is not part of the content of the document (e.g., filename, creation date, file size, author).

Figure 2:
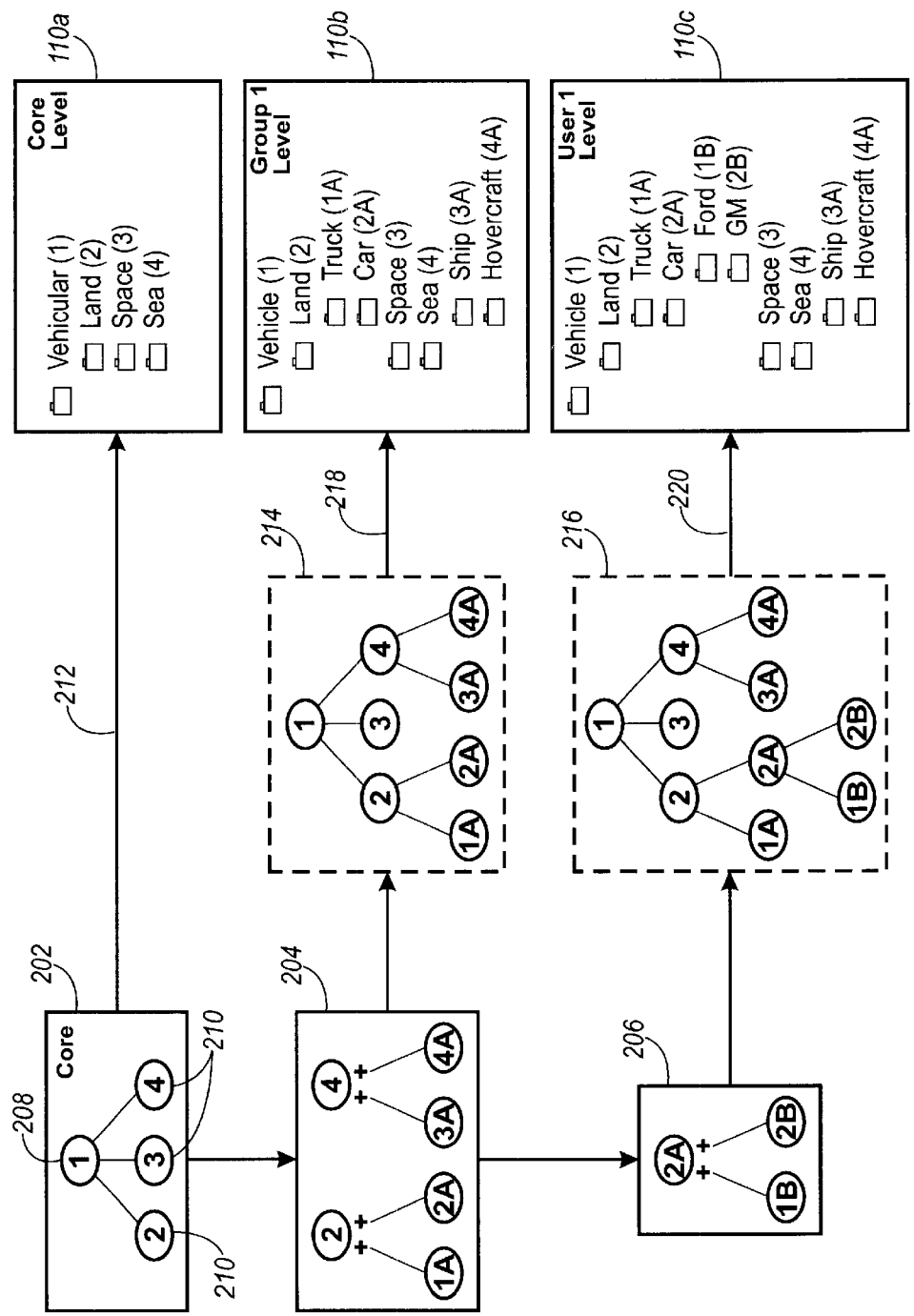
FIG. 2 illustrates an example in which a core filing structure is customized at multiple levels.

More specifically, FIG. 2 illustrates a core filing structure 202 and multiple customized filing structures 204 and 206.

The customized filing structures have multiple levels of customization. For example, the customized filing structure 204 (i.e., group 1 level) is used to derive the customized filing structure 206 (i.e., user 1 level). The filing structures 202, 204, and 206 include elements that are labeled in the Figure for the purpose of identification. For example, the core filing structure 202 has a hierarchy that includes root element 208, which is labeled as "1" and three lower level elements 210, which are labeled as "2", "3", and "4". The structure translator 124 translates the corresponding values for each of these elements for display on the application program interface 110*a*, as indicated by arrow 212. It will be appreciated, however, by those skilled in the art that the hierarchical structure 202 can be represented on an application program interface using various other arrangements of icons and content.

Unlike conventional filing systems, the customized filing structures 204 and 206 define sequences of layered modifications to the core filing structure 202 and the customized filing structure 204, respectively. Each sequence of modifications defines a different context in which to file (i.e., categorize) documents. Modifying a filing structure may involve adding elements to (e.g., adding element 1A and 2A to element 2), modifying elements in, or deleting elements from a preexisting filing structure. That is, the customized filing structures define cumulative customizations that are layered on top of each other. For example as shown in FIG. 2, the user level filing structure 206 is layered on the group level filing structure which in turn is layered on the core level filing structure. By defining sequences of layered modifications, the structure translator 124 is able to translate between different levels of customization. The sequence of modifications 204 and 206 can used to define a customized filing structure 214 and 216, respectively. These customized filing structures 214 and 216 can then be displayed on application program interfaces 110*b* and 110*c* as indicated by arrows 218 and 220, respectively.

Figure 3:
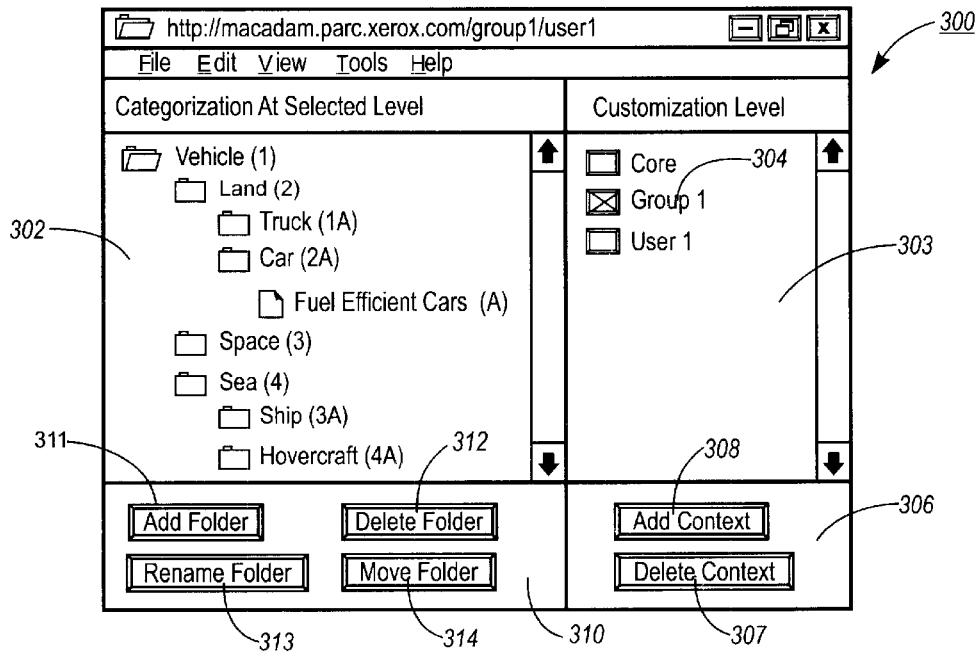
FIG. 3 illustrates an application program interface for displaying the filing structure illustrated in FIG. 2.

FIG. 3 illustrates an application program interface 300 for viewing customized filing structures at different levels of customization. The application program interface 300 includes a display section 302 for viewing the categorization of documents at a particular level of customization selected in display section 303. In the embodiment shown in FIG. 3, the particular level of customization is limited to a hierarchy of customization defined for a particular user (e.g., http://macadam.parc.xerox.com/group1/user1). That user (e.g., user 1) is given access to only those levels of customization to which the user is immediately dependent upon in the hierarchy (e.g., group1 and core). Depending on the customization level selected (e.g., group level 304), the filing structure store 116 is used develop a different context in which to view the shared repository of documents in display section 302. For example, each user could be given access to a shared repository of documents 114 located on a network at for example "macadam.parc.xerox.com".

Figure 4:
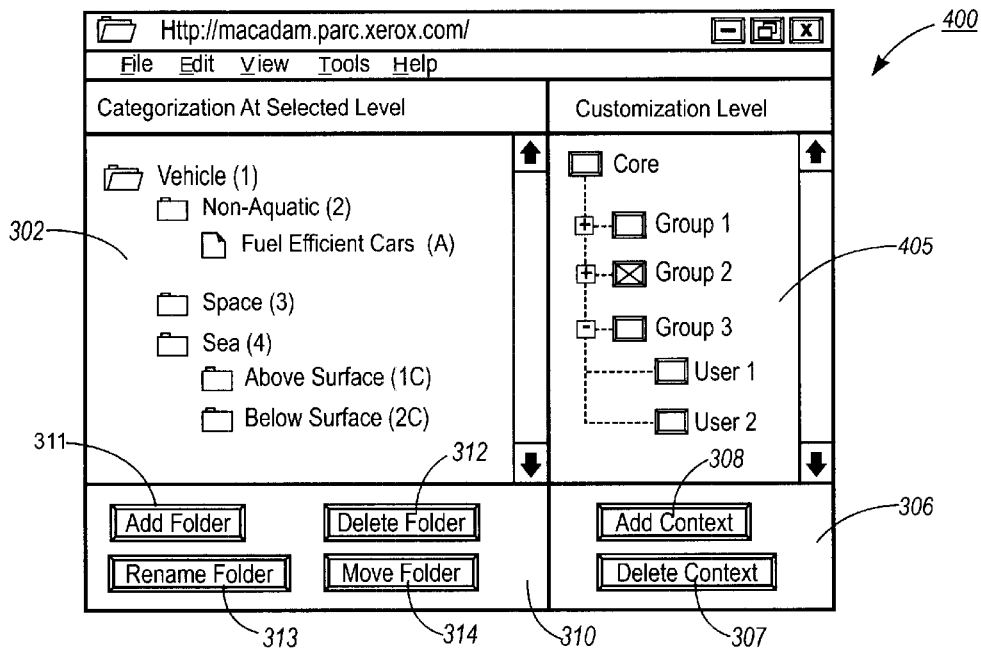
FIG. 4 illustrates an alternate embodiment of the application program interface illustrated in FIG. 3.

FIG. 4 illustrates an alternate embodiment of the application program interface 300 shown in FIG. 3. In this alternate embodiment shown in FIG. 4, an application program interface 400 provides display section 405 that enables the selection of customization levels at any particular level. Advantageously, the application program interface 400 can be used for viewing different customized categorizations of the shared repository of documents 114. In viewing different customized categorizations, a user is able to view a shared repository of documents (i.e., information) arranged in multiple contexts (i.e., perspective) that are mutually intelligible. In certain situations, it will be appreciated by those skilled in the art that it may be beneficial to apply different levels of access control to selected customization levels. In addition, it will be appreciated by those skilled in the art that a user can readily compare different customization levels side-by-side by invoking a second occurrence of the program interface 400.

Figure 5:
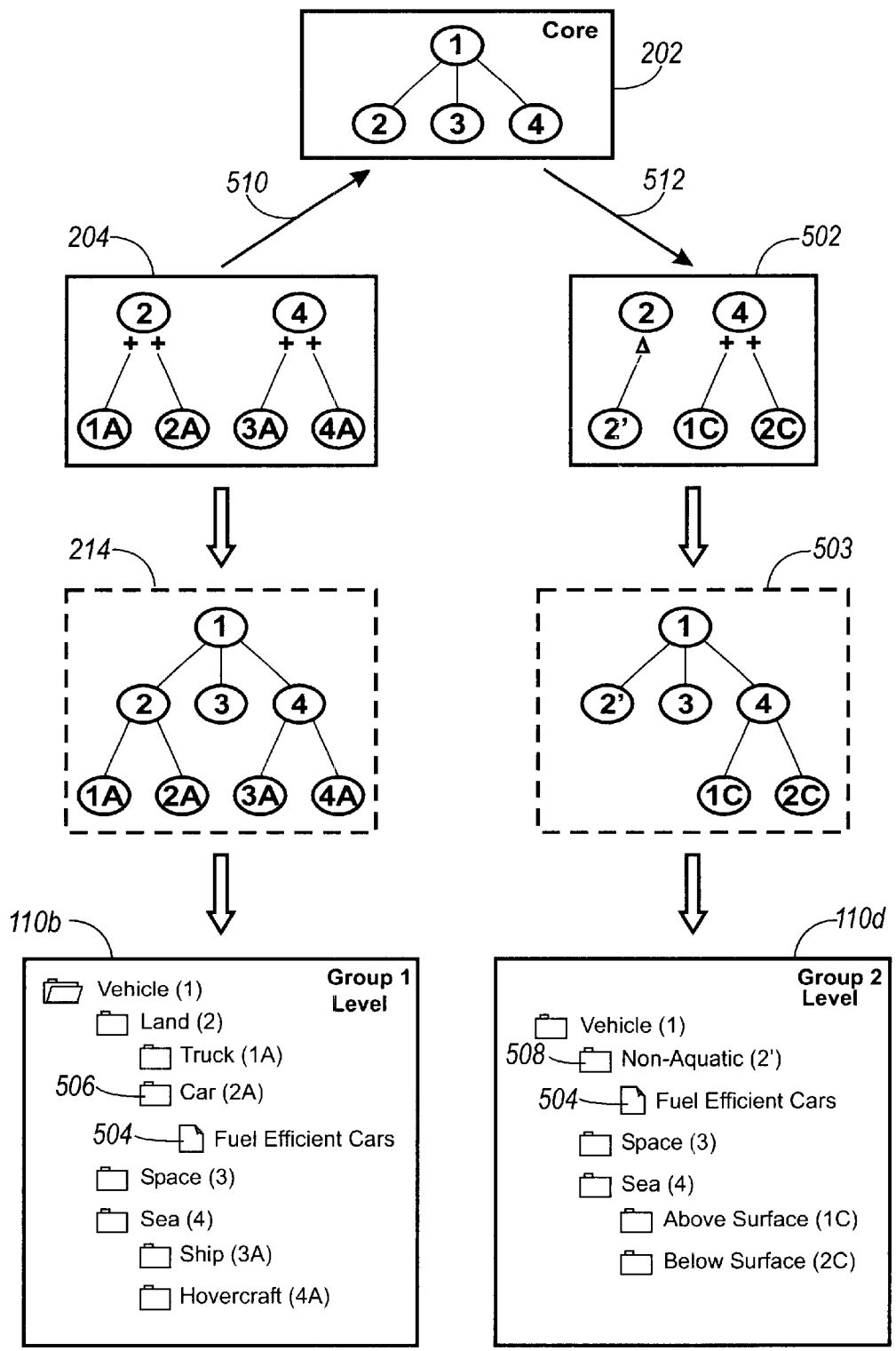
FIG. 5 illustrates a document categorized according to a first customized filing structure and displayed (i.e., retrieved) according to another customized filing structure.

Referring again to FIG. 1, the structure translator 124 interprets documents in shared document repository 114 according to both the context under which the document is filed and the context under which the document is retrieved. For example, assume initially that the customized filing structure 204 for the core filing structure 202 is defined as shown in FIG. 5. In addition, assume that subsequently a document 504 (entitled "Fuel Efficient Cars"), which is stored in the shared repository 114, is filed (e.g., by dragging and dropping the document) in the customized filing structure 204 at the category labeled "Vehicle/Land/Car/," as indicated by reference number 506.

A second user having defined customized filing structure 502 can subsequently view that document using the application program interface 300 in either the context given by the customized filing structure 214 or the customized filing structure 503 (using for example the application program interfaces shown in FIGS. 3 and 4). When viewed in the context of customized filing structure 214, the document 504 is viewed in the context in which it was originally filed. However, when viewed in the context of customized filing structure 503, the document 504 is viewed in the context as indicated by category 508 "Vehicle/Non-Aquatic". Accordingly, the system advantageously presents the shared document 504 in a way that makes sense when it is viewed in the context of categorizations in which the document 504 was not filed even though no one-to-one mapping exits between the two filing structures. Translation between two customized filing structures involves interpreting the sequence of modifications 204 and 502 relative to the core filing structure 202, as indicated by reference numbers 510 and 512.

B. Managing Hierarchical Filing Structures

Referring again to FIG. 1, the category manager 122 receives commands from the application program interface 110 operated by a user. The program interface provides buttons for creating and managing customizations to the core filing structure 118. In section 306 in the program interfaces 300 shown in FIGS. 3 and 4, a user may create or delete a selected customized filing structure with command buttons 308 and 309, respectively. In section 310, a user can add, delete, rename, or move categories defined for a selected filing structure with command buttons, 311, 312, 313, and 314, respectively. It will be appreciated, however, by those skilled in the art that the arrangement of command buttons and the manner in which filing structures are organized on the program interface 300 is one of many different possible configurations. In particular, it will be appreciated that the program interface could be accessed through a web server to provide client independent access to servers coupled to the Internet.

C. Mapping Between Hierarchical Filing Structures

Once categories have been defined and documents organized therein, the application program interface 110 can be used to view documents in the shared repository 114 in one of a plurality of contexts. The context in which documents are organized is important in understanding a particular document's relationship to other documents in the shared repository. In one embodiment, the shared repository is a repository of URLs (uniform resource locator) that reference documents stored on servers located throughout a network (e.g., the Internet). In operation, the application program interface 110 provides a mechanism for sharing different categorizations of a large corpus of documents.

For example, existing Internet portals (e.g., Yahoo, Netscape, MSN, AOL, etc.) organize URLs in a common hierarchical structure. In one embodiment of the operating environment 102, users accessing Internet (or Intranet) portals customize the common hierarchical structure at their application program interface (e.g., browser client interface). After defining a personalized view of the common hierarchical structure, users publish (i.e., share) their view to others in a restricted or unrestricted manner by specifying viewing permissions on a customization level 405. By sharing different personalized views of a common categorization structure, users are able to work together to better understand the different contexts in which to organize documents available on the Internet (or Intranet).

Figure 6:
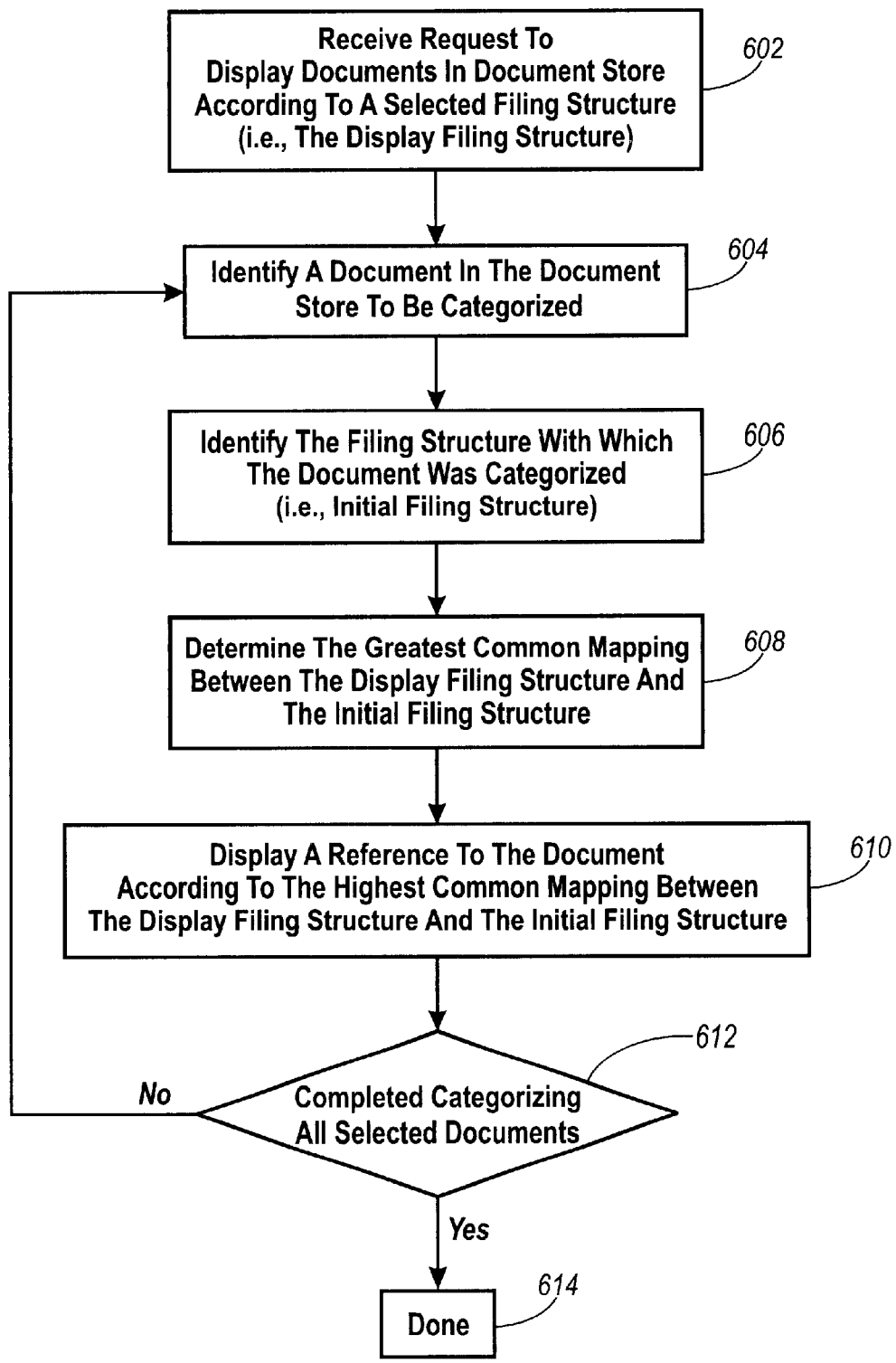
FIGS. 6 and 7 are flow diagrams setting forth the steps for mapping between different customized filing structures.
Figure 7:
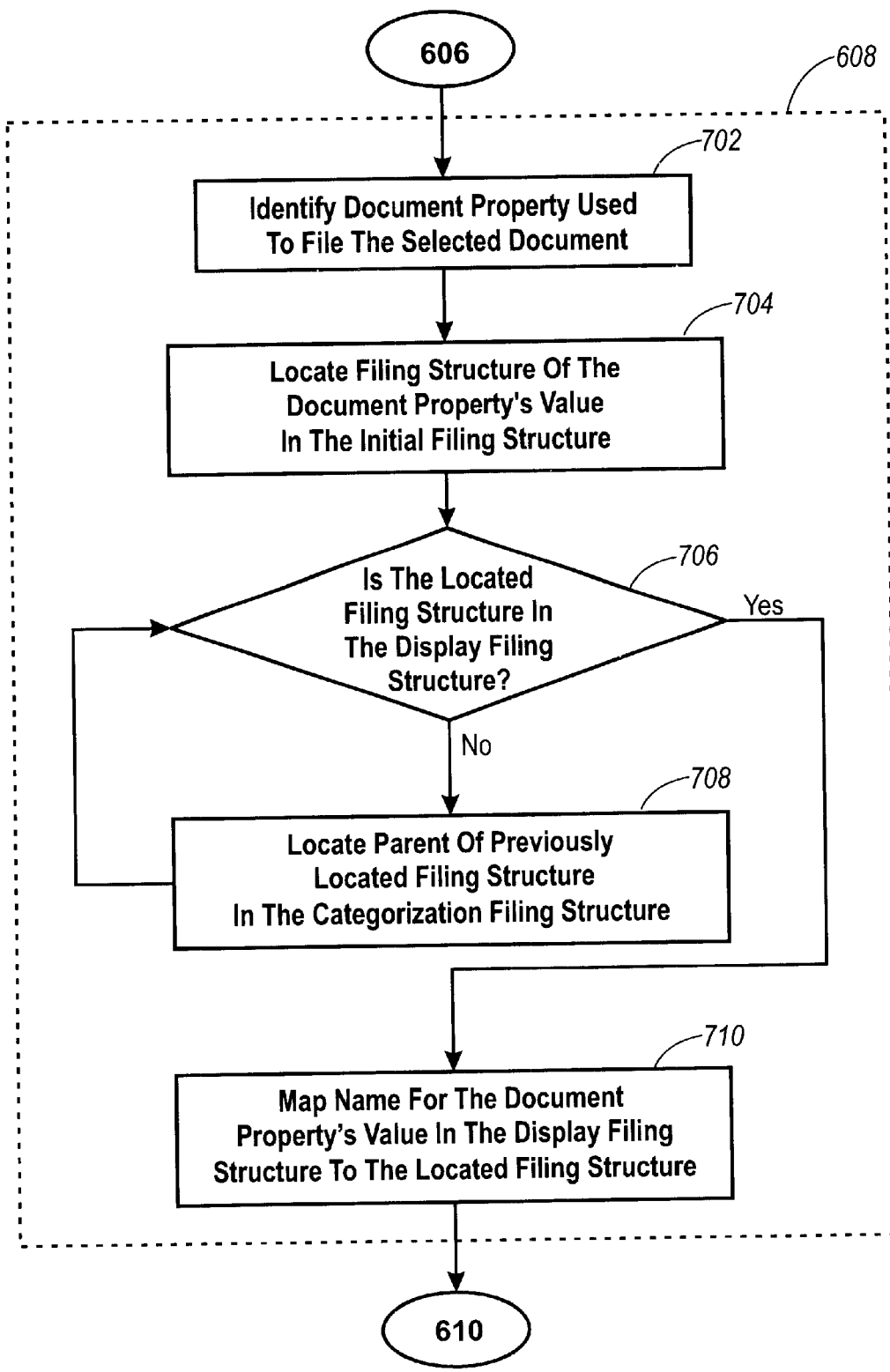

In accordance with yet another aspect of the invention, the structure translator 124 translates between customized filing structures that have structures which are incommensurate with each other (i.e., have either a structural incompatibility or a semantic incompatibility). FIGS. 6 and 7 set forth flow diagrams that define one possible sequence of steps for mapping between customized filing structures that have structures which are incommensurate with each other. Initially at step 602, a request to display documents according to a selected filing structure (i.e., the display filing structure) is received from an application program interface. In one embodiment, the display filing structure can be specified using the application program interface 400 as described above. For each of the documents, or for a specified subset of document, in the document store located at step 604, steps 606, 608, 610, and 612 are performed. At step 612, if all documents have been categorized then step 604 is repeated; otherwise, the routine completes at step 614.

Each document identified at step 604 is examined at step 606 to determine the filing structure with which the document was originally categorized (i.e., the initial filing structure). In accordance with yet another aspect of the invention, each document records auditing information that can be used to determine by whom and at what time a document was categorized according to a particular filing structure. Recording auditing information insures that knowledge of how a document was originally categorized in the initial filing structure is retained.

Given the initial filing structure and the display filing structure, the greatest common mapping between the two filing structures for a document is determined at step 608. Subsequently at step 610, a reference to the document (e.g., name, URL, etc.) is displayed in the context of the display filing structure according to the greatest common mapping determined at step 608. One method for determining the greatest common mapping (step 608) between the initial filing structure and the display filing structure for the document in document store 114 is set forth in FIG. 7.

Initially at step 702 in FIG. 7, the property used to file a selected document is identified. In the file system model, a document has only one property—the location at which the document is stored. However, in an expanded model, documents may have any number of properties (e.g., name, source, topic, format, create date, size, etc.). In one embodiment of the invention, only one of the properties of a document is assigned a value (i.e., "the document property's value") that represents one of a set of hierarchies that categorizes the document in a filing structure. At step 704, the filing structure of the document property's value in the initial filing structure is located.

Subsequently at step 706, the display filing structure is examined to determine whether the filing structure located at step 704 (i.e., "the located filing structure") is present in the display filing structure. If the located filing structure is not present in the display filing structure then step 708 is performed; otherwise, step 710 is performed. At step 708, the parent of the located filing structure is substituted for the filing structure located at step 706 before repeating step 706. At step 710, the name for the document property's value in the display filing structure is mapped to the located filing structure. Finally, at step 610 shown in FIG. 6, a reference to the document is displayed on the application program interface.

D. Hierarchical Structures In The Placeless Environment

In another embodiment of the invention, the Placeless Environment provides means for customizing filing structures. One feature of the Placeless Environment is that documents are organized according to their properties, rather than their location. In addition to documents, the Placeless Environment recognizes "document references," which appear as normal documents but actually refer to documents stored elsewhere, and under the control of some user. Each document reference encapsulates its own set of properties or metadata. Further details of the Placeless Environment are disclosed in the following U.S. Pat. Nos.: 6,266,686; 6,308,179; 6,324,551; 6,266,670; 6,240,429; 6,269,308; 6,253,217; which are incorporated herein by reference; and U.S. patent application Ser. Nos.: 09/143,772; 09/144,143; 09/143,777; 09/143,555, which are incorporated herein by reference.

In order to organize documents hierarchically, the Placeless Environment is adapted to recognize "abstract documents." An abstract document is used in the Placeless Environment to represent structured data using properties. In accordance with the invention, properties of a document are used to record the filing structure that maps to one of the categories defined for a property in a filing structure store. That is, each property of a document can have a category associated therewith that has one of a plurality of hierarchically organized values. In addition to recording a filing structure, properties of a document are used also used to record the properties of a document reference.

More specifically, each piece of filing structure is represented as a content free placeless document whose properties describe its categorization in a filing structure. These pieces include each possible property, each individual possible enumerated value, and each hierarchical relationship between possible values. The Placeless document for a possible property, for example has a Placeless property corresponding to the name of the property, its description, and the space of its possible values. A link from one object of the filing structure to another is encoded as a property on the document representing the first object whose value is the document representing the second object. The auditing information on the filing structure is also recorded on the corresponding Placeless documents. Thus, the record of which user created part of the filing structure becomes a property of the Placeless document corresponding to that part.

The support for different, but related, (i.e., customized) filing structures is implemented in this embodiment with a context mechanism. All the objects for the various filing structures are stored in the same space (i.e., in the same Placeless system). There is an empty Placeless document for each different part of the base (i.e., core) filing structure, and additional Placeless documents for each customized filing structure. Each of these documents is assigned a context property in the Placeless Environment to record which filing structures it is a part of. The contexts are structured hierarchically, with the base context at the top, and the other contexts below it. The view from any context sees those parts of the filing structure marked with that context or any higher one.

This context mechanism allows relations between different filing structures. For example, a group's filing structure may extend a value hierarchy of the base structure. This introduces new values for filing structure locations that are tagged to be visible only in the group's context and links, also tagged to be visible only in the group's context, from those values to values in the base hierarchy. For example, suppose that group A has given a document a property that is visible only in their context. If the document is viewed from the base context, the system will see that document corresponding to the property's value marked with the finer context. The system will then follow links up the value hierarchy until it reaches a value that is in the base context, and then display that value.

In the Placeless Environment, customization of document categories is supported with the use of an explicit representation of a categorization structure. By making the categorization structure sensitive to context (e.g., representing users, groups, projects) category structures can be manages independently of different users. Further details for managing categories of documents in the Placeless environment are described by Dourish et al. in "Building Bridges: Customisation and Mutual Intelligibility in Shared Category Management," and by Dourish et al. in "Uniform Document Interactions Using Document Properties," both of which are published on the Internet at http://www.parc.xerox.com/csl/members/dourish/papers/index.html/, and incorporated herein by reference.

E. Summary

The present invention allows users to customize a shared filing structure that is used to categorize a shared collection of documents. The filing structure is, itself, first class data of the system. Users customize the filing structure to express how they want the shared collection of documents to be categorized. Advantageously, different users can share customizations to the filing structure by viewing the shared collection of documents according to different classification structures.

It will be appreciated by those skilled in the art that the present invention is adapted to handle multiple filings by different users of the same document. Because document content is recorded only once, the only additional content stored for a document filed more than once is the additional filing information. For example, each document may have two filing designations, where one is assigned to the producer of the document and the other is assigned to the recipient of the document.

It will also be appreciated by those skilled in the art that two customized filing structures may reduce to a common filing structure that has more categories than the core filing structure. In this instance, the core filing structure for the purpose of translation between the two customized filing structures is the common filing structure.

It will be further appreciated by those skilled in the art that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for sharing customizations to a filing system in which documents stored in memory are categorized and accessed through an application program interface, comprising the steps of:

(a) receiving input for defining a core filing structure having hierarchically organized filing categories; the core filing structure providing a first mapping for categorizing documents stored in the memory;

(b) receiving input for defining a first customized filing structure having hierarchically organized filing categories; the first customized filing structure being defined by a first sequence of modifications to the core filing structure to provide a second mapping for categorizing documents stored in the memory;

(c) receiving input for categorizing documents stored in the memory according to one of the core filing structure and the first customized filing structure;

(d) receiving input requesting that a first document stored in the memory and categorized at step (c) according to one of the core filing structure and the first customized filing structure be viewed according the other of the core filing structure and the first customized filing structure; and (e) translating between the core filing structure and the first customized filing structure with the first sequence of modifications to categorize the first document stored in the memory as requested at step (d) when the first mapping defined by the core filing structure is structurally and semantically incompatible with the second mapping defined by the first customized filing structure.

2. The method according to claim 1, further comprising the step of storing the core filing structure and the first sequence of modifications defining the first customized filing structure in memory.

3. The method according to claim 1, further comprising the step of generating at the application program interface the hierarchically organized categories of the first customized filing structure by combining the core filing structure with the first sequence of modifications.

4. The method according to claim 1, further comprising the steps of:

(f) receiving input for defining a second customized filing structure having hierarchically organized filing categories; the second customized filing being defined by a second sequence of modifications to the core filing structure to provide a third mapping for categorizing documents stored in the memory;

(g) receiving input for categorizing documents stored in the memory according to one of the first customized filing structure and the second customized filing structure;

(h) receiving input requesting that a second document stored in the memory and categorized at step (g)

according to one of the first customized filing structure and the second customized filing structure be organized according the other of the first customized filing structure and the second customized filing structure; and (i) translating between the first customized filing structure and the second customized filing structure with the first sequence of modifications and the second sequence of modifications to view the second document stored in the memory as requested at step (h) when the second mapping defined by the first customized filing structure is structurally and semantically incompatible with the third mapping defined by the second customized filing structure.

5. The method according to claim 4, wherein the second customized filing structure defined at step (f) is hierarchically independent from the first customized filing structure.

6. The method according to claim 4, wherein the second customized filing structure defined at step (f) is hierarchically dependent from the first customized filing structure.

7. The method according to claim 6, further comprising the step of generating at the application program interface the hierarchically organized categories of the second customized filing structure by combining the core filing structure with the first sequence of modifications defining the first customized filing structure and the second sequence of modifications defining the second customized filing structure.

8. The method according to claim 4, wherein step (i) determines a greatest common mapping between the first customized filing structure and the second customized filing structure.

9. The method according to claim 1, wherein step (e) determines a greatest common mapping between the core filing structure and the first customized filing structure.

10. An information management system, comprising:
memory for storing documents;
an application program interface for receiving input:
  defining a core filing structure having hierarchically organized filing categories that provide a first mapping for categorizing the documents stored in the memory;
  defining a first customized filing structure having hierarchically organized filing categories defined by a first sequence of modifications to the core filing structure to provide a second mapping for categorizing the documents stored in the memory;
  categorizing the documents stored in the memory according to one of the core filing structure and the first customized filing structure; and
  requesting that a first document stored in the memory and categorized according to one of the core filing structure and the first customized filing structure be viewed according the other of the core filing structure and the first customized filing structure; and
an application program responsive to the input received at the application program interface for translating between the core filing structure and the first customized filing structure with the first sequence of modifications to categorize the first document stored in the memory when the first mapping defined by the core filing structure is structurally and semantically incompatible with the second mapping defined by the first customized filing structure.

11. The document management system according to claim 10, wherein the references to the documents are uniform resource locators.

12. The document management system according to claim 10, wherein the application program interface is accessed using a web browser.

13. The document management system according to claim 10, further comprising means for generating at the application program interface the hierarchically organized categories of the first customized filing structure by combining the core filing structure with the first sequence of modifications.

14. The document management system according to claim 10, wherein:
the application program interface receiving input
  defining a second customized filing structure having hierarchically organized filing categories and being defined by a second sequence of modifications to the core filing structure to provide a third mapping for categorizing documents stored in the memory,
  categorizing documents stored in the memory according to one of the first customized filing structure and the second customized filing structure, and
  requesting that a second document stored in the memory and categorized according to one of the first customized filing structure and the second customized filing structure be organized according the other of the first customized filing structure and the second customized filing structure, and
the application program responsive to the input received at the application program interface translates between the first customized filing structure and the second customized filing structure with the first sequence of modifications and the second sequence of modifications to view the second document stored in the memory when the second mapping defined by the first customized filing structure is structurally and semantically incompatible with the third mapping defined by the second customized filing structure.

15. The document management system according to claim 14, wherein the second customized filing structure is hierarchically independent from the first customized filing structure.

16. The document management system according to claim 14, wherein the second customized filing structure is hierarchically dependent from the first customized filing structure.

17. The document management system according to claim 16, wherein the application program interface determines the hierarchically organized categories of the second customized filing structure by combining the core filing structure with the first sequence of modifications defining the first customized filing structure and the second sequence of modifications defining the second customized filing structure.

18. The document management system according to claim 14, wherein the application program determines a greatest common mapping between the first customized filing structure and the second customized filing structure.

19. The document management system according to claim 10, wherein the application program determines a greatest common mapping between the core filing structure and the first customized filing structure.

20. A method for sharing customizations to a filing system in which documents stored in memory are categorized and accessed through an application program interface, comprising the steps of:
(a) receiving input for defining a core filing structure having hierarchically organized filing categories; the core filing structure providing a first mapping for categorizing documents stored in the memory;
(b) receiving input for defining a first customized filing structure having hierarchically organized filing categories; the first customized filing structure being defined by a first sequence of modifications to the core filing structure to provide a second mapping for categorizing documents stored in the memory;

(c) receiving input for defining a second customized filing structure having hierarchically organized filing categories; the second customized filing structure being defined by a second sequence of modifications to the core filing structure to provide a third mapping for categorizing documents stored in the memory;

(d) receiving input for categorizing documents stored in the memory according to one of the first customized filing structure and the second customized filing structure;

(e) receiving input requesting that a document stored in the memory and categorized at step (d) according to one of the first customized filing structure and the second customized filing structure be organized according the other of the first customized filing structure and the second customized filing structure; and (f) translating between the first customized filing structure and the second customized filing structure with the first sequence of modifications and the second sequence of modifications to view-the document stored in the memory as requested at step (e) when the second mapping defined by the first customized filing structure is structurally and semantically incompatible with the third mapping defined by the second customized filing structure.

* * * * *